United States Patent [19]
McEllhenney et al.

[11] Patent Number: 5,015,394
[45] Date of Patent: May 14, 1991

[54] APPARATUS AND METHOD FOR THE TREATMENT OF WATER WITH OZONE

[75] Inventors: Colburn McEllhenney; Edwin A. Hess, both of Akron, Pa.

[73] Assignee: Hess Machine Company, Ephrata, Pa.

[21] Appl. No.: 349,529

[22] Filed: May 9, 1989

[51] Int. Cl.$^5$ ............................................. C02F 1/78
[52] U.S. Cl. ................................... 210/744; 210/760; 210/764; 210/104; 210/105; 210/220; 261/77; 261/124
[58] Field of Search .............. 210/629, 150, 151, 220, 210/760, 758, 764, 744, 104, 105; 261/77, 124

[56] References Cited

U.S. PATENT DOCUMENTS

| | | | |
|---|---|---|---|
| 1,808,956 | 6/1931 | Ketterer | 261/77 |
| 1,853,045 | 4/1932 | Gnau | 261/77 |
| 2,009,230 | 7/1935 | Hartman | 210/760 |
| 2,050,771 | 8/1936 | Wait | 210/760 |
| 2,669,440 | 2/1954 | Lindenbergh | 261/77 |
| 3,246,885 | 4/1966 | Stevens | 261/77 |
| 3,446,488 | 5/1969 | Mail et al. | 261/77 |
| 3,775,314 | 11/1973 | Beitzel et al. | 210/760 |
| 3,910,838 | 10/1975 | Kaelin | 210/629 |
| 4,100,071 | 7/1978 | Beurer et al. | 210/220 |
| 4,230,571 | 10/1980 | Dodd | 210/760 |
| 4,353,717 | 10/1982 | Herbrechtsmeier et al. | 210/760 |
| 4,507,253 | 3/1985 | Wiesmann | 210/760 |
| 4,572,821 | 2/1986 | Brodard et al. | 210/760 |
| 4,683,122 | 7/1987 | Concordia et al. | 261/77 |

Primary Examiner—Stanley Silverman
Assistant Examiner—Cynthia L. Nessler
Attorney, Agent, or Firm—Richard O. Church

[57] ABSTRACT

A method for treating water with ozone in which a countercurrent flow of liquids is established within a treatment vessel to insure intimate contact and substantial contact time between ozone and water. The ozone and water are first pre-mixed by passing the ozone through a diffuser into a moving stream of water and the mixture is circulated in a tortuous path through a coil and discharged at the end of the diffuser coil through a number of orifices into the lower portion of the treatment vessel in a generally upwardly and outwardly direction with respect to the vertical axis of the treatment tank. Treated water suitable for bottling and storage is withdrawn from the bottom of the treatment vessel at an elevation below that of the discharge orifices to establish a countercurrent flow between the incoming and outgoing fluids.

4 Claims, 2 Drawing Sheets

APPARATUS AND METHOD FOR THE TREATMENT OF WATER WITH OZONE

BACKGROUND OF THE INVENTION

1. The Field of the Invention

This invention relates to the disinfection of water and, more particularly, to improved methods and apparatus for treating water with ozone. It will be understood that the disinfection of water refers to processes in which pathogenic organisms present in water are killed to prevent the propagation of water-borne diseases.

It is well known that the demands for potable water supplies have grown enormously in the past several decades. Not only has it become difficult to find new sources of water, but also, the existing supplies of ground and surface water have become polluted by industrial and domestic wastes. As a consequence, the necessary treatment of water required to insure the removal of domestic and industrial wastes, chemicals, odors, and pathogenic organisms has become a complex art. With increased pollution, larger dosages of chemicals, most commonly chlorine, are required to achieve the desired level of disinfection. Unfortunately, chlorine imparts a distinct unpleasant taste and smell to water which cannot economically be removed in processing. When highly chlorinated, the water not only tastes bad by itself but also its unpleasant character permeates foods cooked in it and imparts a rather medicinal flavor to beverages made from it, such as coffee and tea.

To meet the rising demand for potable water that is free from objectionable odors and tastes, it has become a common practice to bottle water obtained from uncontaminated sources and use this bottled water for drinking and cooking. Even when this water is obtained from springs or wells in rural areas where the ground water is substantiallY free from industrial and domestic wastes, it is frequently necessary to disinfect the water to reduce pathogenic organisms to safe levels as required by various governmental agencies. It is at once obvious that if chlorine is used as the disinfectant, the primary purpose of preparing bottled water will be nullified.

For the above reasons it is important in bottling water to provide methods for the disinfection of water that will not impart a characteristic odor or taste to the water. Such methods include, for example, treatment with ultraviolet rays, heating, boiling or distilling, treatment with ozone, and other methods. This invention, however, is concerned only with the disinfection of water by treatment with ozone.

Ozone treatment is preferred in preparing potable bottled water since ozone is a strong disinfectant that is effective in destroying pathogenic organisms; ozone is a strong oxidizing agent that removes colors, odors and tastes from the water; ozone is comparatively inexpensive; and most importantly, ozone does not impart a distinctive flavor, color or odor of its own to the water.

While the treatment of water with ozone leaves no chemical residue in the water, this method of disinfection can be rather inefficient and difficult to control. Since ozone is unstable and rapidly disintegrates and further, since it is only slightly soluble in water, it is very important to achieve intimate gas/water contact during treatment. Also, the effect of ozone is not instantaneous and a certain minimum contact time with water is required. All of these factors must be taken into account to be conduct an efficient and reliable ozone treatment.

While the instability of ozone and its low solubility create problems in the disinfection of water, it is these same properties that make the use of ozone of value. Since ozone is unstable, readily disintegrates, and is only slightly soluble in water, water that has been treated with ozone has no residual odor or taste, even though ozone in itself has a characteristic pungent odor.

Since intimate contact between water and ozone is difficult to achieve, it is common practice to dose the water with quantities of ozone in considerable excess of that theoretically required. In addition to being wasteful of ozone these processes are inefficient in that the concentration of ozone may vary considerably between isolated regions of water being treated. Some of the water may not be adequately disinfected, while other water may be bottled with an appreciable excess of ozone. In the first instance, the hazard to health is obvious. In the second instance, the excess ozone may separate from the water during storage and gather at the top of a container. Then, when the container is opened, an initial discharge of ozone takes place that may confront the prospective consumer with a pungent odor. While this occurrence is not in itself harmful or dangerous, it may result in a dissatisfied consumer who mistakenly believes that the water is contaminated or that it has spoiled in storage and transit.

For the above reasons, it is important that the ozonation of water be conducted efficiently and in a manner in which only the required amount of ozone necessary to disinfect the water is used. Obviously, too little ozone can result in inadequate disinfection and excess of ozone can cause customer dissatisfaction.

It has been found, as a practical matter, that it is desirable to add ozone in slight excess of that required to disinfect the water to provide for sterilization of the bottle, the cap and the air space at the top of the bottle. This is particularly important when the water may remain in the bottle for an appreciable length of time before it is used. Quite generally, from about 0.05 to about 0.5 p.m., and more preferably about 0.2 p.m free ozone in the water at the time of bottling will suffice to provide a safe level of residual disinfection.

2. Description of the Prior Art

Methods and apparatus for treating water with ozone as known to the prior art, as, for example, the continuous process disclosed in U.S. Pat. No. 3,448,045. Herein, the importance of operating the ozone generator continuously, without interruption, so that the ozone of uniform quantity and quality. When water is not being treated, rather than discontinue operation of the apparatus, the incoming air supply is discharged to the atmosphere. It was found that if the ozone generator was stopped and started with a varying water demand, the quality of the ozone became inconsistent. The patent also teaches that intimate gas/liquid contact can be achieved by mixing the ozone and water by flowing them through a coiled pipe.

SUMMARY OF THE INVENTION

Accordingly, it is an object of this invention to provide methods and apparatus for preparing water treated with ozone that is essentially free from odors, color, taste and pathogenic organisms.

Another object of this invention is to provide improved methods and apparatus for treating water with ozone.

Another object of this invention is to provide a method for preparing potable water for bottling and storage.

Yet another object of this invention is to provide methods and means for the treatment of water with ozone which will destroy pathogenic organisms efficiently without leaving excessive residual quantities of ozone in the water.

These and other objects of this invention are achieved by diffusing ozone into a confined moving stream of water, flowing the mixture through a coiled pipe located near the bottom of a treatment tank and discharging the mixture from the coil into the tank in a direction generally upwardly and outwardly disposed with respect to the vertical axis of the tank. The intimate mixing of the ozone and the gas is further insured by withdrawing treated water from the tank, as for bottling, at an elevation below the treatment coil, and preferably from the bottom of the tank. By these means, a countercurrent flow is established between the upward flow of the incoming fluids and the downward flow of the outgoing fluids.

The invention can be best understood from the accompanying drawings in which.

DETAILED DESCRIPTION OF THE DRAWINGS

Figure 1:
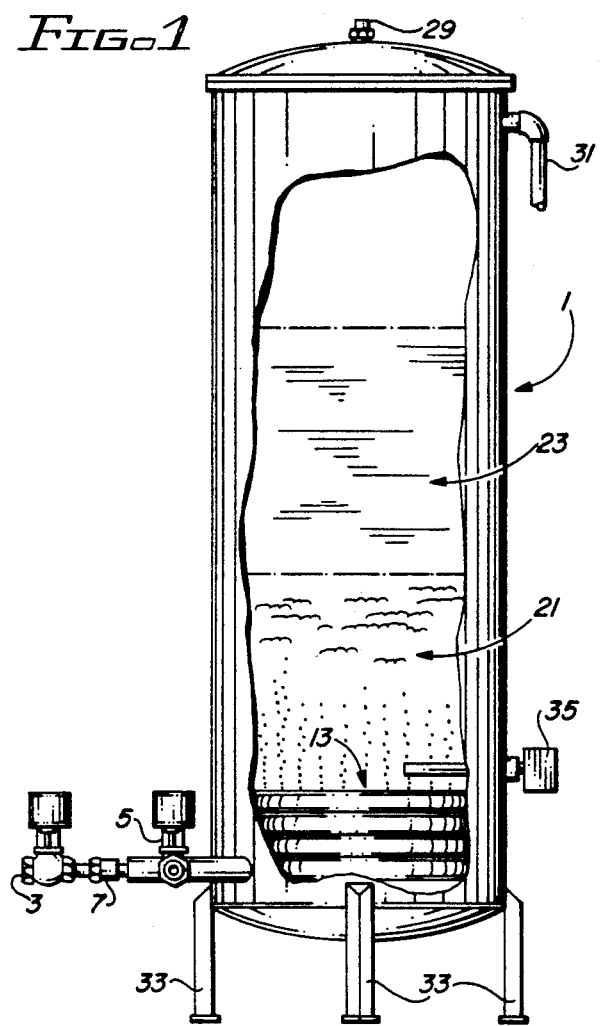
FIG. 1 is a schematic view, partially cut away, of the apparatus of this invention.
Figure 2:
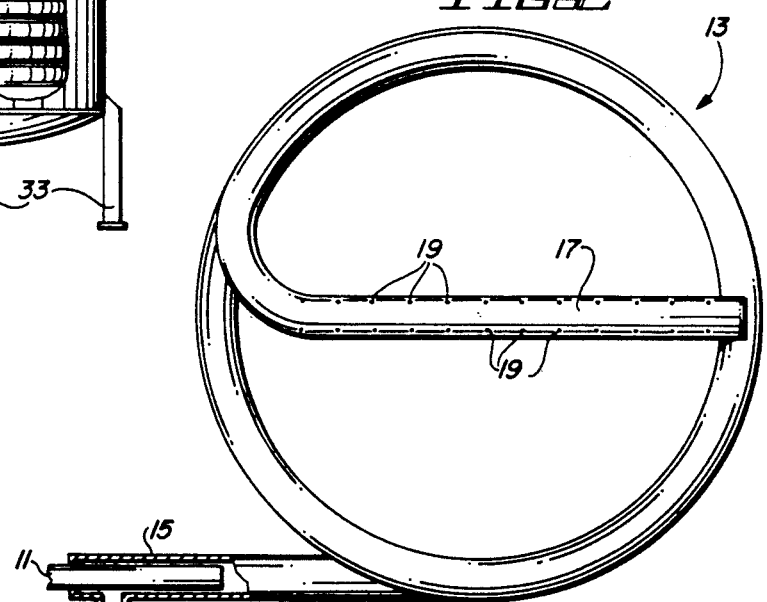
FIG. 2 is a schematic view in plan and partially cut away illustrating the diffuser tube and adsorption coil used in the practice of this invention.
Figure 3:
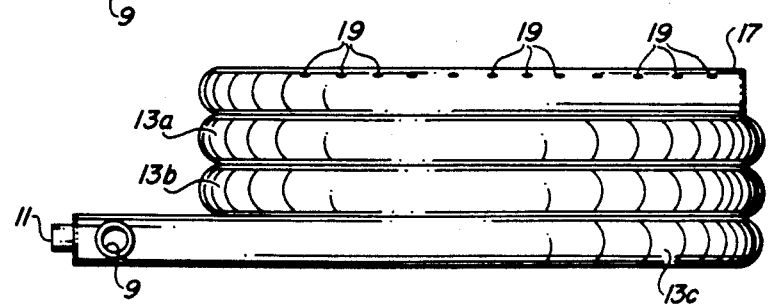
FIG. 3 is a side elevation of the adsorption tube shown in FIG. 2.
Figure 4:
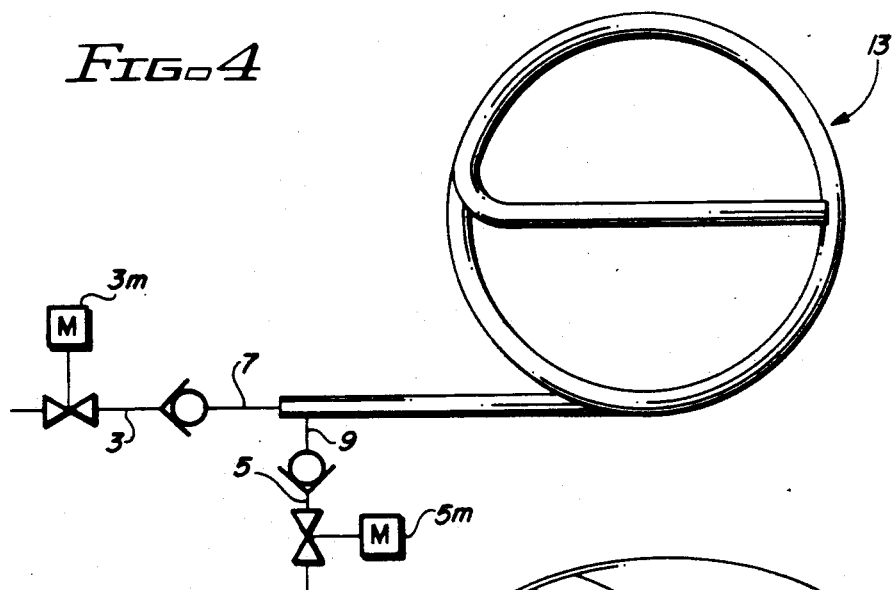
FIG. 4 is a schematic diagram in plan showing a preferred arrangement of ozone and water control valves used in the practice of this invention.

Referring to the figures of the drawings in which the same numeral references to the various ports are used in all the drawings, there is shown a treatment vessel 1 mounted on support legs 33 and adapted to receive fluids by means of combined ozone stop and check valve 3 controlled by a motor 3m and a combined water stop and check valve 5 controlled by motor 5m. The valve 3 meters the flow of ozone introduced into feed line 7 which leads to an ozone diffuser tube 11 located at the entrance end 15 of an adsorption coil 13. The valve 5 meters the flow of water introduction into water feed line 9 which leads to the entrance end 15 of the coil 13 in the region surrounding the diffuser tube 11. The adsorption coil 13 comprises a number of turns, illustrated in the drawings as 13a, b and c, wound about a vertical axis, and terminating with a final segment 17 illustrated in a straight horizontal piece of pipe overlying the turns 13a, b and c and passing through the vertical axis of the turns. The final segment 17 of the adsorption coil 13 contains a number of discharge orifices 19 that are positioned to discharge fluids in a generally upwardly and outwardly direction with respect to the axis of the treatment vessel 1.

The treatment vessel 1 is fitted with a gas vent 29, a water overflow or withdrawal line 31 and a water underflow line 25 valved as at 27. A liquid level sensor 35 is provided to monitor the liquid level within the vessel.

In operation, an ozone generator (not shown) is activated and ozone at comparatively low pressures, e.g., 5 to 15 psig, is introduced into ozone feed line 7 by opening control valve 3 a desired amount as controlled by the motor 3m. Water control valve 5 is then opened by operation of the motor control 5m to introduce water into the entrance end 15 of the adsorption coil 13 at a pressure similar to that of the ozone. The ozone passing through the ozone diffuser tube 11 is mixed in intimate contact with water to be treated that is introduced through water feed line 9. The pressure on the ozone and the water introduced into the adsorption coil 13 forces the water and ozone to flow through the coils of the adsorption coil 13. As the water and ozone are swirled in a circular path through the adsorption coil 13, the ozone is intimately contacted and partially dissolved in the feed water. The intimate mixture of ozone and water is then discharged from the upper exit end of the adsorption coil 13 through orifices 19 in a generally upwardly and outwardly direction relative to the vertical axis of the treatment vessel 1. By impelling the mixture of ozone and water upwardly and outwardly toward the side walls of the treatment vessel 1, a zone of turbulence 21 is established in which intimate mixing of the ozone and water takes place. A zone of comparative quiescence 23 will be developed above the turbulent zone 21 to the extent the kinetic energy of the fluids discharged from the orifices 19 is dissipated.

Figure 5:
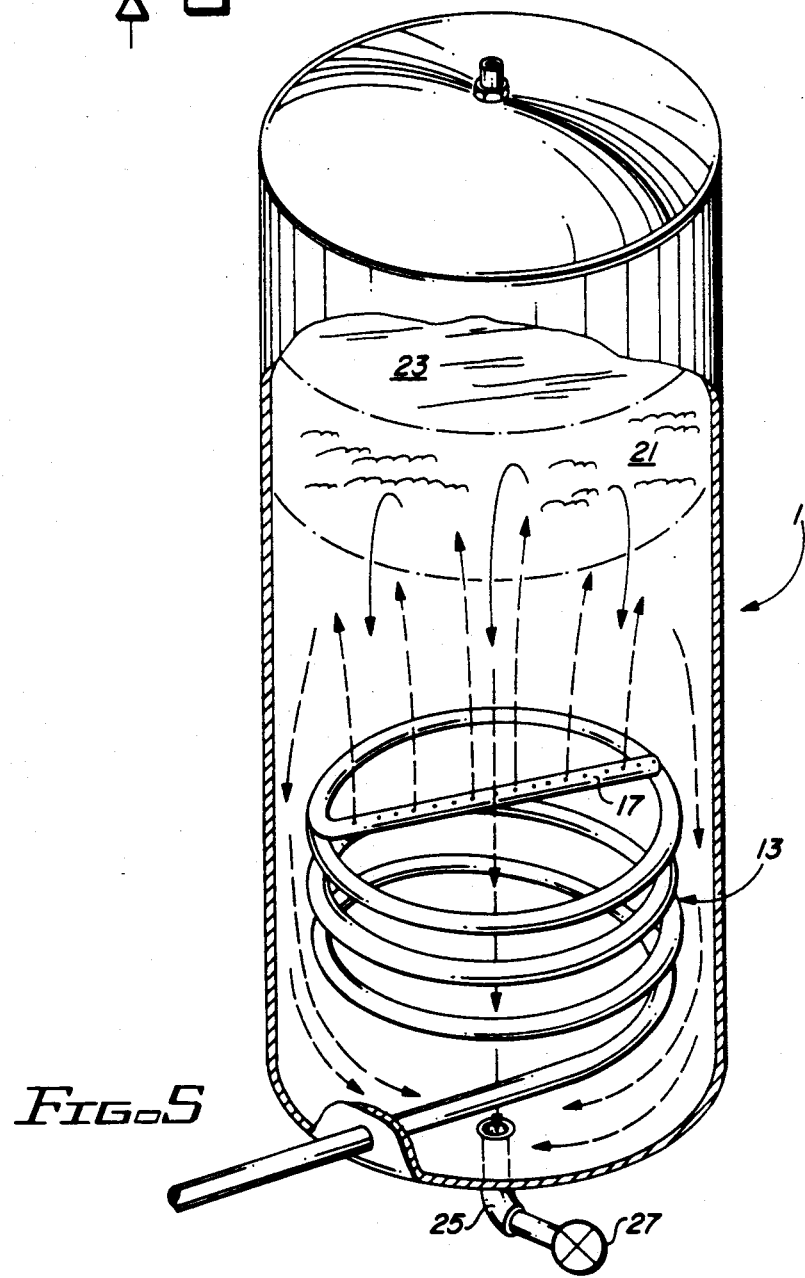
FIG. 5 is a pictorial representation of the flow of fluids within the treatment vessel of this invention.

The above arrangement causes the mixture of water and ozone to move in a generally upwardly direction through the treatment vessel 1. Conversely, the treated water is removed from the treatment vessel 1 in a generally downwardly direction because the underflow discharge pipe 25 is located below the adsorption coil 35. This establishes a counter-current flow of fluid between the uprising stream of ozone and water introduced into treatment vessel 1 through orifices, 19, and the downward flow treated water withdrawn from the underflow conduit 25. This countercurrent flow is illustrated in FIG. 5 wherein the flow of the incoming fluids is represented by solid lines and the flow of the discharging fluids is represented by dashed lines.

Motor control 5m of the water valve 5 is used to discontinue the flow of water into the device of this invention, preferably by the liquid level sensing device 35 when the treatment vessel 1 becomes filled. When this occurs, the motor 3 is energized and shuts the valve 3 to discontinue the introduction of ozone into the diffuser tube 11. When the valve 3 shuts, the ozone generator remains on but a relief valve opens to discharge the incoming air to the atmosphere. While these features are not illustrated in the drawings, they are similar to those illustrated in U.S. Pat. No. 3,448,045 referred to above and, for this purpose, incorporated herein by reference.

We claim:

1. A method for the treatment of water with ozone comprising the steps of:
   diffusing ozone under pressure into a moving stream of water confined within a pipe;
   advancing the mixture of ozone and water through a tortuous path defined by the pipe;
   discharging the fluid mixture of ozone and water through a number of directionally oriented orifices at the end of the pipe into a lower region of a treatment vessel in an outwardly and upwardly direction with reference to the vertical axis of the treatment vessel;

establishing a zone of turbulence within the treatment vessel by the discharge of the fluid mixture from the orifices;

withdrawing the fluid mixture from a region adjacent the bottom of the treatment vessel and below the level of the orifices;

whereby water treated with ozone is withdrawn from the treatment vessel in a direction generally opposite to that at which the fluid mixture is discharged into the treatment vessel to establish a generally countercurrent flow of fluid within the treatment vessel.

2. Apparatus for the treatment of water with ozone comprising a generally vertical treatment tank;

an adsorption coil adapted to contain water and ozone under pressure located near the bottom of the tank;

orifices located adjacent the end of the adsorption coil positioned to discharge a fluid mixture of ozone and water from the coils in a generally outwardly and upwardly direction with respect to the vertical axis of the treatment tank;

valved inlet means for introducing water under pressure into the end of the adsorption coil remote from the orifices;

diffuser means for introducing ozone into the adsorption coil in a region immediately adjacent the water inlet means; and means for establishing a generally countercurrent flow of fluid within the treatment tank, said countercurrent flow establishing means comprising means for withdrawing fluid from the treatment tank below the level of the orifices in a direction generally opposite to that at which the fluid mixture is discharged into the treatment tank.

3. Apparatus according to claim 2 further comprising a liquid level sensing means, located in the upper portion of the treatment tank for controlling the valved inlet means.

4. Apparatus according to claim 3 further comprising a control valve means for controlling the flow of ozone into the diffuser means, the control valve and the valve means being responsive to the level sensing means.

* * * * *